(12) United States Patent
Shenaq et al.

(10) Patent No.: US 11,305,710 B2
(45) Date of Patent: Apr. 19, 2022

(54) BUMPER ASSEMBLY

(71) Applicant: Ford Global Technologies, LLC, Dearborn, MI (US)

(72) Inventors: Mohammed Shenaq, Dearborn, MI (US); Ray Hari Manalan Rethinam, Canton, MI (US); Sudip Sankar Bhattacharjee, Novi, MI (US); Matthew Smith, Ferndale, MI (US); Neil Clarke, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 16/522,733

(22) Filed: Jul. 26, 2019

(65) Prior Publication Data

US 2021/0024023 A1 Jan. 28, 2021

(51) Int. Cl.
| | |
|---|---|
| *B60R 19/12* | (2006.01) |
| *B60R 19/18* | (2006.01) |
| *B60R 19/50* | (2006.01) |
| *B60R 21/34* | (2011.01) |
| *B60R 19/02* | (2006.01) |
| *B60R 19/03* | (2006.01) |

(52) U.S. Cl.
CPC .............. *B60R 19/12* (2013.01); *B60R 19/18* (2013.01); *B60R 19/50* (2013.01); *B60R 21/34* (2013.01); *B60R 19/023* (2013.01); *B60R 19/03* (2013.01); *B60R 2019/1886* (2013.01); *B60R 2019/505* (2013.01)

(58) Field of Classification Search
CPC ... B60R 2019/505; B60R 19/50; B60R 19/12; B60R 19/522; B60R 19/52; B60R 2019/1886; B60R 2019/527; B60R 2019/525; B60R 19/56; B60R 21/34; B60R 2021/0051; B60R 2021/0053
USPC .......................................... 293/115, 121, 122
See application file for complete search history.

(56) References Cited

U.S. PATENT DOCUMENTS

| | | | |
|---|---|---|---|
| 6,890,010 B2 | 5/2005 | Bergman | |
| 6,994,384 B2 | 2/2006 | Shuler et al. | |
| 8,141,918 B2 | 3/2012 | Miller et al. | |
| D749,999 S * | 2/2016 | Curie | D12/169 |
| 10,246,036 B2 | 4/2019 | Bhattacharjee et al. | |
| 10,836,442 B1 * | 11/2020 | Grattan | B60R 13/005 |
| 2004/0174025 A1 | 9/2004 | Converse et al. | |

(Continued)

FOREIGN PATENT DOCUMENTS

| | | | |
|---|---|---|---|
| JP | 406247237 A | * | 9/1994 |
| JP | 411115654 A | * | 4/1999 |

OTHER PUBLICATIONS

Machine Translation of JP406247237A, printed from the EPO website, Feb. 25, 2021.*

(Continued)

*Primary Examiner* — Jason S Morrow
(74) *Attorney, Agent, or Firm* — Frank A. MacKenzie; Bejin Bieneman PLC

(57) ABSTRACT

A bumper assembly includes a bumper beam elongated in a cross-vehicle direction and a bumper that is plastic. The bumper is elongated in the cross-vehicle direction and is affixed to the bumper beam. The bumper beam is rigid relative to the bumper. The bumper defines a cavity enclosed by the bumper. The cavity is elongated in the cross-vehicle direction.

18 Claims, 8 Drawing Sheets

(56) References Cited

U.S. PATENT DOCUMENTS

| | | | | |
|---|---|---|---|---|
| 2007/0176441 A1* | 8/2007 | Lau | ......................... | B60R 19/52 |
| | | | | 293/115 |
| 2007/0222238 A1* | 9/2007 | Kobayashi | .............. | B60R 19/52 |
| | | | | 293/115 |
| 2008/0079271 A1* | 4/2008 | Maruko | .................. | B60R 19/52 |
| | | | | 293/102 |
| 2015/0136512 A1* | 5/2015 | Tashiro | ................... | B60R 19/18 |
| | | | | 180/271 |
| 2019/0061678 A1* | 2/2019 | Shen | ....................... | B60R 19/12 |
| 2019/0308577 A1* | 10/2019 | Fichtinger | ................ | B60R 19/18 |
| 2019/0359155 A1* | 11/2019 | Shenaq | ................... | B60R 19/52 |
| 2020/0070895 A1* | 3/2020 | Greggs | ................. | B62D 21/02 |
| 2020/0164822 A1* | 5/2020 | Yoshimoto | .............. | B60R 19/02 |
| 2020/0231107 A1* | 7/2020 | Gunther | .................. | B60R 19/18 |

OTHER PUBLICATIONS

Machine Translation of JP411115654A, Tejima, printed from the FITS database, Aug. 25, 2021.*

* cited by examiner

BUMPER ASSEMBLY

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during a vehicle-pedestrian impact.

Some vehicles, such as light duty trucks and sport utility vehicles (SUVs), for example, may have a bumper height that could lead to an uneven impact on the femur and/or tibia of the pedestrian by the vehicle bumper during the vehicle-pedestrian impact. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the bumper. As such, there is an opportunity to design a vehicle front-end for pedestrian leg impact energy management while addressing ground clearance requirements.

DETAILED DESCRIPTION

Figure 1:
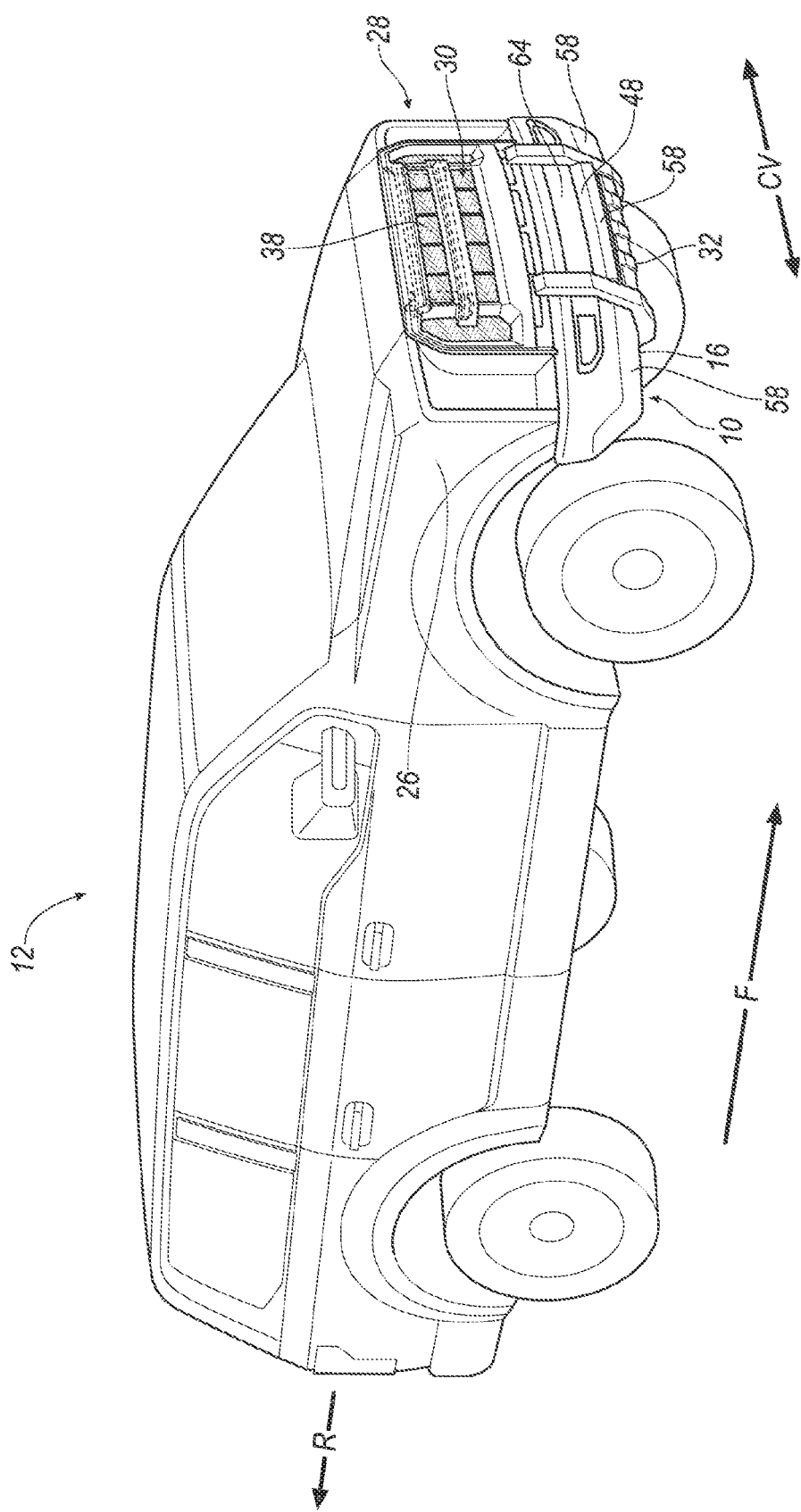
FIG. 1 is a perspective view of a vehicle including a front end having a grille assembly and a bumper assembly below the grille assembly.

A bumper assembly includes a bumper beam elongated in a cross-vehicle direction and a bumper that is plastic. The bumper is elongated in the cross-vehicle direction and affixed to the bumper beam. The bumper beam is rigid relative to the bumper. The bumper defines a cavity enclosed by the bumper. The cavity is elongated in the cross-vehicle direction.

The bumper may include an air intake elongated in the cross-vehicle direction. The bumper may include an upper beam above the air intake and a lower beam below the air intake. The cavity may be defined by the lower beam and the upper beam. The upper beam and the lower beam may be monolithic. The bumper may include lamp compartments between the upper beam and the lower beam.

The bumper may include lamp compartments above the cavity. The bumper may include an upper beam above the lamp compartments and a lower beam below the lamp compartments.

The bumper may include an upper beam and a lower beam spaced from the upper beam. The lower beam may define the cavity. The bumper beam may abut the upper beam and the lower beam. The bumper beam may abut the upper beam and a skid plate may abut the lower beam. The lower beam has an upper end and a lower end and increases in thickness in a vehicle-rearward direction toward the lower end. The cavity may increase in thickness in the vehicle-rearward direction toward the lower end of the lower beam.

The bumper may have a lower end and the cavity may increase in thickness to the lower end. At least a portion of the cavity at the lower end may be greater than 30 mm in a vehicle-rearward direction.

A skid plate may abut the bumper below the bumper beam and may ex from the bumper in a vehicle-rearward direction.

The bumper may have a class-A surface.

The bumper beam may be metal.

The bumper may have a reference height less than 500 mm.

The cavity may be aligned with a knee of a pedestrian impact test leg form.

The cavity may be aligned with a knee of a flex-PLI leg form.

The bumper may be blow molded.

With reference to the Figures, wherein like numerals indicate like parts throughout the several views, a bumper assembly 10 of a vehicle 12 includes a bumper beam 14 elongated in a cross-vehicle direction CV and a bumper 16 that is plastic. The bumper 16 is elongated in the cross-vehicle direction CV and is affixed to the bumper beam 14. The bumper beam 14 is rigid relative to the bumper 16. The bumper 16 defines a cavity 18 enclosed by the bumper beam 14. The cavity 18 is elongated in the cross-vehicle direction CV.

During an impact with a leg of a pedestrian, the cavity 18 collapses to absorb energy. For example, with reference to FIG. 8, the bumper 16 may impact the knee 20 of a pedestrian impact test leg form 22. The leg form 22 may be a flexible pedestrian leg impactor (Flex-PLI) leg form. Example regulations that can use the leg form 22 include Global Technical Regulation (GTR), ECE R127, and Korean Motor Vehicle 12 Safety Standards (KMVSS). Example new car assessment programs that can use the leg form 22 include EuroNCAP, CNCAP, and ANCAP.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 12 includes a vehicle frame 24 and a vehicle body 26. The vehicle body 26 and the vehicle frame 24 may have a body-on-frame construction (also referred to as a cab-on-frame construction) in which the body 26 and frame 24 are separate components, i.e., are modular, and the body 26 is supported on and affixed to the frame 24. The example shown in the Figures (for example FIG. 5) is a body-on-frame construction. As another example, the vehicle body 26 and the vehicle frame 24 may be of a unibody construction in which the vehicle frame 24 is unitary with a vehicle body 26 (including frame rails, pillars, roof rails, etc.). Alternatively, the frame 24 and body 26 may have any suitable construction. The frame 24 and body 26 may be of any suitable material, for example, steel, aluminum, and/or fiber-reinforced plastic, etc.

The vehicle 12 has a front-end structure 28. The front-end structure 28 includes a grille assembly 30, the bumper assembly 10, and a skid plate 32. One or more components of the front-end structure 28 may include components of the vehicle body 26 and/or the vehicle frame 24, as described further below. The grille assembly 30 is above the bumper assembly 10. The bumper assembly 10 is above the skid plate 32 and vehicle-forward of the skid plate 32

The grille assembly 30 may be a component of the body 26 and may be supported on other components of the body 26. For example, the vehicle body 26 may include two rails 34. The rails 34 may support fenders (not numbered) of the vehicle body 26. The rails 34 may be referred to as fender support rails and/or shotgun rails. The rails 34 are spaced from each other along the cross-vehicle direction CV. The rails 34 may each extend from the vehicle frame 24 to an A-pillar of the vehicle body 26. The rails 34 may be supported on the vehicle frame 24, in which case the rails 34 support the grille assembly 30 on the vehicle frame 24. As one example, each rail 34 may be fixed directly to the vehicle frame 24 with no intermediate component, e.g., by fasteners, welding, etc.

The grille assembly 30 may include a grille reinforcement 36 and a grille 38. The grille reinforcement 36 supports the grille 38 on the vehicle body 26, e.g., on the rails 34. The grille reinforcement 36 may be attached to the rails 34 in any suitable way, e.g., fasteners, welding, etc. The grille 38 may be supported by the grille reinforcement 36. The grille 38 may be fixed relative to the grille reinforcement 36. In other words, the grille 38 and the grille reinforcement 36 move together as a unit.

Figure 8:
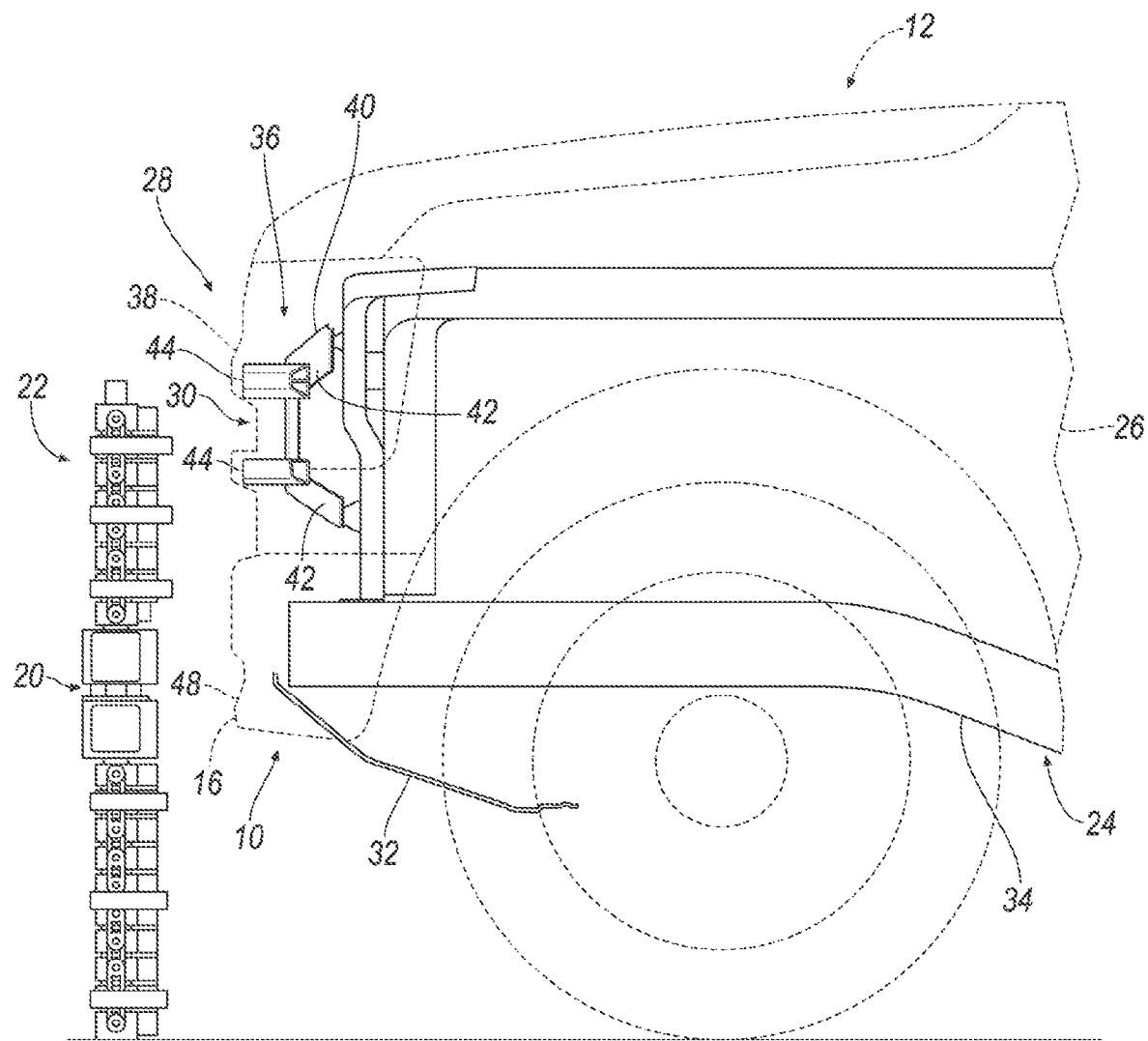
FIG. 8 is a side view of a portion of the vehicle.

The grille reinforcement 36 may be elongated along the cross-vehicle direction CV. The grille 38 may extend over, i.e., may cover, the grille reinforcement 36. The grille reinforcement 36 reinforces the grille 38 to distribute the load across a leg form 22 during a pedestrian impact test, as shown in FIG. 8, and as described further below. Specifically, the grille reinforcement 36 and bumper 16 are positioned relative to each other to distribute loading of force across the leg form 22, i.e., so both the grille reinforcement 36 and the bumper 16 impact the leg form 22 and reduce relative movement between the femur and the tibia.

The grille reinforcement 36 includes the two brackets 40. Each bracket 40 is disposed between the rails 34 and the grille 38. The grille 38 is in a vehicle-forward direction F of the brackets 40. The two brackets 40 are spaced from each other along the cross-vehicle direction CV.

Each bracket 40 has two legs 42. Both legs 42 extend from the respective rail 34 toward the grille 38. In other words, each leg 42 is attached to the respective rail 34 and extends in the vehicle-forward direction F toward the grille 38. As one example, as shown in the Figures, each bracket 40 may be spaced from the grille 38, e.g., by bars 44. As another example, each leg may extend to the grille 38, i.e., be in contact with the grille 38. The legs 42 are attached to the respective rail in any suitable way, e.g., fasteners, welding, etc.

As set forth above, the grille reinforcement 36 includes at least one bar 44. In the example shown in the Figures, the grille reinforcement 36 includes the two bars 44. The grille reinforcement 36 may include additional bars 44 (not shown) in addition to the two bars 44 and which have the same structure and perform the same function as the bars 44 shown in the Figures. In examples including more than one bar 44, the bars 44 are spaced from each other, i.e., vertically spaced from each other. The spacing between the two bars 44 and the vertical position of the bars 44 may be designed based on the vehicle 12 ride-height to align with the desired part of the leg form 22. In examples including more than one bar, the bars 44 may be parallel to each other.

The bars 44 may be aligned with each other along the vehicle 12 longitudinal axis L. In other words, the bars 44 may be in the same vertical plane. As another example, the bars 44 may be offset from each other along the vehicle 12 longitudinal axis L.

The bars 44 are elongated along the cross-vehicle direction CV from one of the brackets 40 to the other of the brackets 40. The bars 44 may extend outboard beyond the brackets 40. In another example, the bars 44 may terminate at the brackets 40.

The two bars 44 may be attached to both of the brackets 40. The bars 44 may be fixed to the brackets 40 in any suitable way including fasteners, welding, etc.

With reference to the Figures, the bars 44 may vary in size and in material. The bars 44 may be of any suitable material including steel, aluminum, etc. The bars 44 may, for example, be hollow. As another example, the bars 44 may have a reinforcement inside the bars 44. As another example, the bars 44 may be solid (not shown). The bars 44 may be different from each other in shape.

The grille 38 may be elongated along a cross-vehicle direction CV. The grille 38 may elongated from one of the rails 34 to the other of the rails 34. The grille 38 is in the vehicle-forward direction F of the rails 34.

The grille 38 includes a vehicle-forward face 46. The vehicle-forward face 46 faces the vehicle-forward direction F. The vehicle-forward face 46 may be a class-A surface, i.e., a surface specifically manufactured to have a high-quality, finished aesthetic appearance free of blemishes. The grille 38 may be of any suitable material, including plastic, such as injection-molded plastic; metal, such as aluminum or steel; or any other suitable material.

The vehicle-forward face 46 of the grille 38 may cover the bars 44 in the vehicle-forward direction F, as shown in the Figures. In other words, in such an example, the bars 44 are not visible from an exterior of the vehicle 12. As another example, the bars 44 may extend through the grille 38 such that the vehicle-forward faces 46 of the bars 44 are visible from an exterior of the vehicle 12. In such an example, both the vehicle-forward face 46 of the grille 38 and the vehicle-forward faces 46 may each be a class-A surface, i.e., a surface specifically manufactured to have a high-quality, finished aesthetic appearance free of blemishes. In the example where the bars 44 extend through the grille 38, the vehicle-forward faces 46 of the bars 44 may be flush with the vehicle-forward face 46 of the grille 38, or the vehicle-forward faces 46 of the bars 44 may be in the vehicle-forward direction of the vehicle-forward face 46 of the grille 38.

The grille 38 may include cavities for receiving the bars 44. In other words, the cavities are sized to receive the bars 44. In one embodiment, the grille 38 is over-molded to the grille reinforcement 36. "Over-molded" is a structural description of the grille 38, not the process by which the grille 38 is made. In other words, the over-molded grille 38 has the structure of an over-molded component. When over-molded, the grille 38 may be a single, uniform piece of material with no seams, joints, and may be fixed to the bars 44 without fasteners or adhesives holding the grille 38 and the bars 44 together. In such an example, the grille 38 has a shape that conforms to a mold, e.g., an injection mold, used to form the grille 38 as an over-molded component to the bars 44. In other examples, the grille reinforcement 36 is fixed to the grille 38 with fasteners, adhesive, etc.

The grille reinforcement 36, i.e., both bars 44 and both brackets 40, is rigid relative to the leg form 22 of a pedestrian impact test. In other words, during the pedestrian protection impact test, the bars 44 and the brackets 40 experience minimal deformation upon impact with the leg form 22.

As set forth above, the front-end structure 28 includes the bumper assembly 10. The bumper assembly 10 includes the bumper beam 14 and the bumper 16 supported on the bumper beam 14. The bumper 16 may be attached to the vehicle frame 24. As an example, the bumper 16 may be fixed directly to the vehicle frame 24 and by any suitable way including fasteners, welding, etc. The bumper beam 14 is rigid relative to the bumper 16, e.g., the bumper 16 deforms more than the bumper beam 14 during impact with the leg form 22. The bumper beam 14 may be of any suitable material such as metal (steel, aluminum, etc.), fiber-reinforced plastic, etc. The bumper 16 is affixed to the bumper beam 14 in any suitable manner, e.g., fasteners.

The bumper 16 is elongated along the cross-vehicle direction CV. The bumper 16 has a vehicle-forward face 48. The vehicle-forward face 48 may be a class-A surface, i.e., a surface specifically manufactured to have a high-quality, finished aesthetic appearance free of blemishes.

The bumper 16 is plastic. The bumper 16 may be blow molded. "Blow-molded" is a structural description of the bumper 16, not the process by which the bumper 16 is made. In other words, the blow-molded bumper 16 has the structure of a blow-molded component. When blow-molded, the bumper 16 may be monolithic (i.e., a single, uniform piece of material with no seams, joints, etc.) with the cavity 18 enclosed by the plastic of the bumper 16. The blow-molded bumper 16 has a shape that conforms to a mold and the shape includes the class-A surface, as described above.

Figure 5:
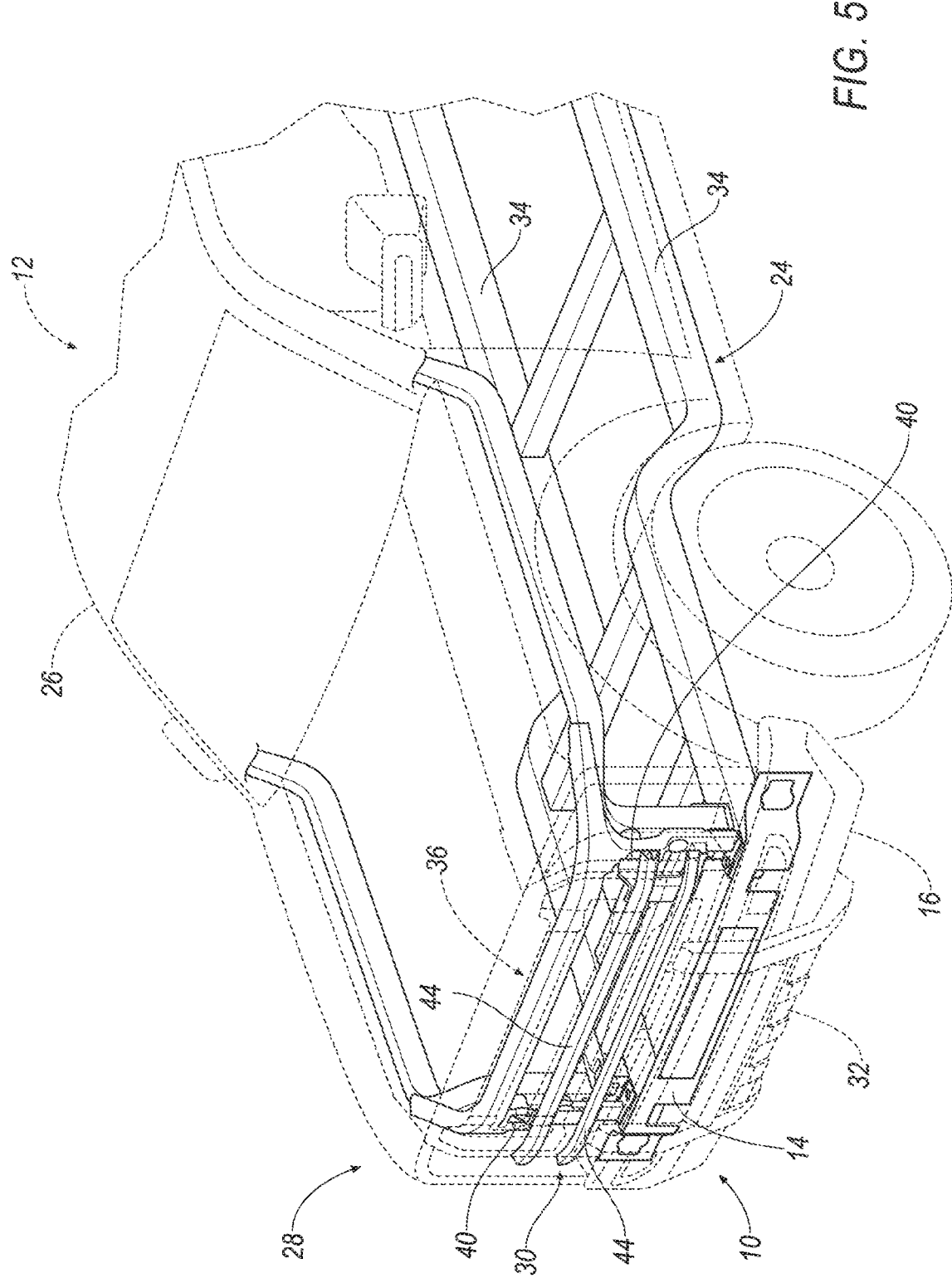
FIG. 5 is a perspective view of a portion of the vehicle including components of the body and the frame.
Figure 6:
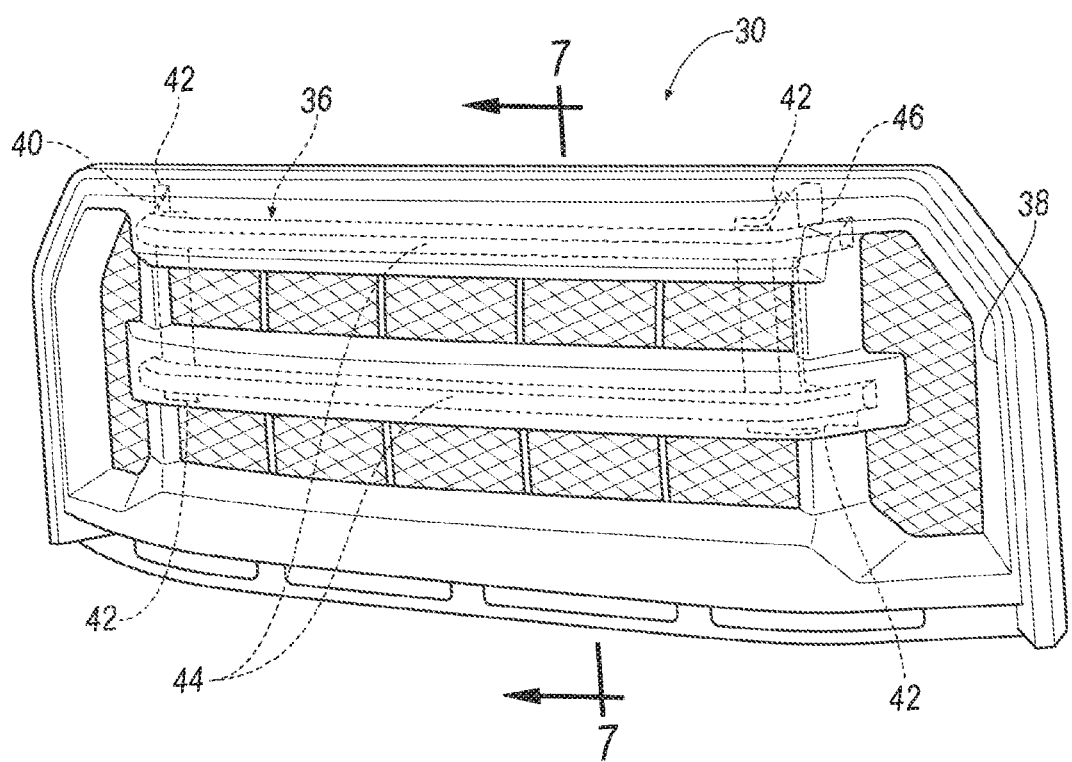
FIG. 6 is a perspective view of the grille assembly.
Figure 7:
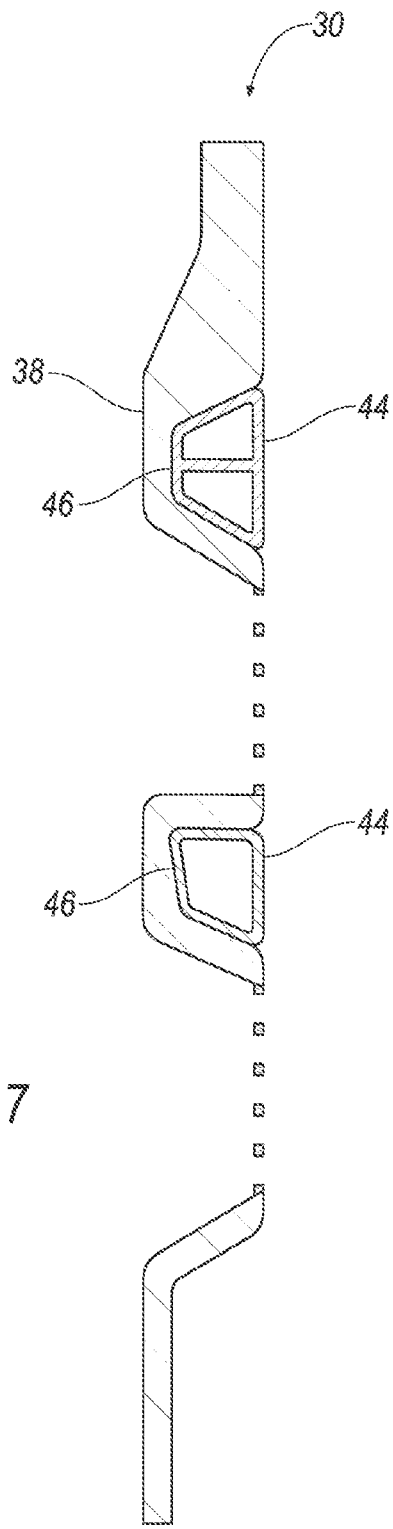
FIG. 7 is a cross-sectional view of the grille assembly.

With reference to FIGS. 5 and 8, the bumper assembly 10 is below the bars 44 Specifically, the bumper 16 is below the bars 44. The bumper 16 may be substantially aligned with the bars 44 along the vehicle 12-longitudinal axis L. Specifically, and as shown in FIG. 8, the bars 44 have a vehicle-forward face 46, and the vehicle-forward face 46 of the bars 44 and the vehicle-forward face 46 of the bumper 16 may be aligned along the vehicle 12-longitudinal axis L. As an example, the vehicle-forward face 46 of the bumper 16 and the vehicle-forward faces 46 of the bars 44 may be aligned along the vehicle 12-longitudinal axis L within +/−15 millimeters. Accordingly, the vehicle-forward face 46 of the bumper 16 and the vehicle-forward faces 46 of the bars 44 may simultaneously engage a leg form 22, as shown in FIG. 8, to distribute loading of force across the leg form 22 and reduce relative movement between the femur and the tibia.

Figure 3:
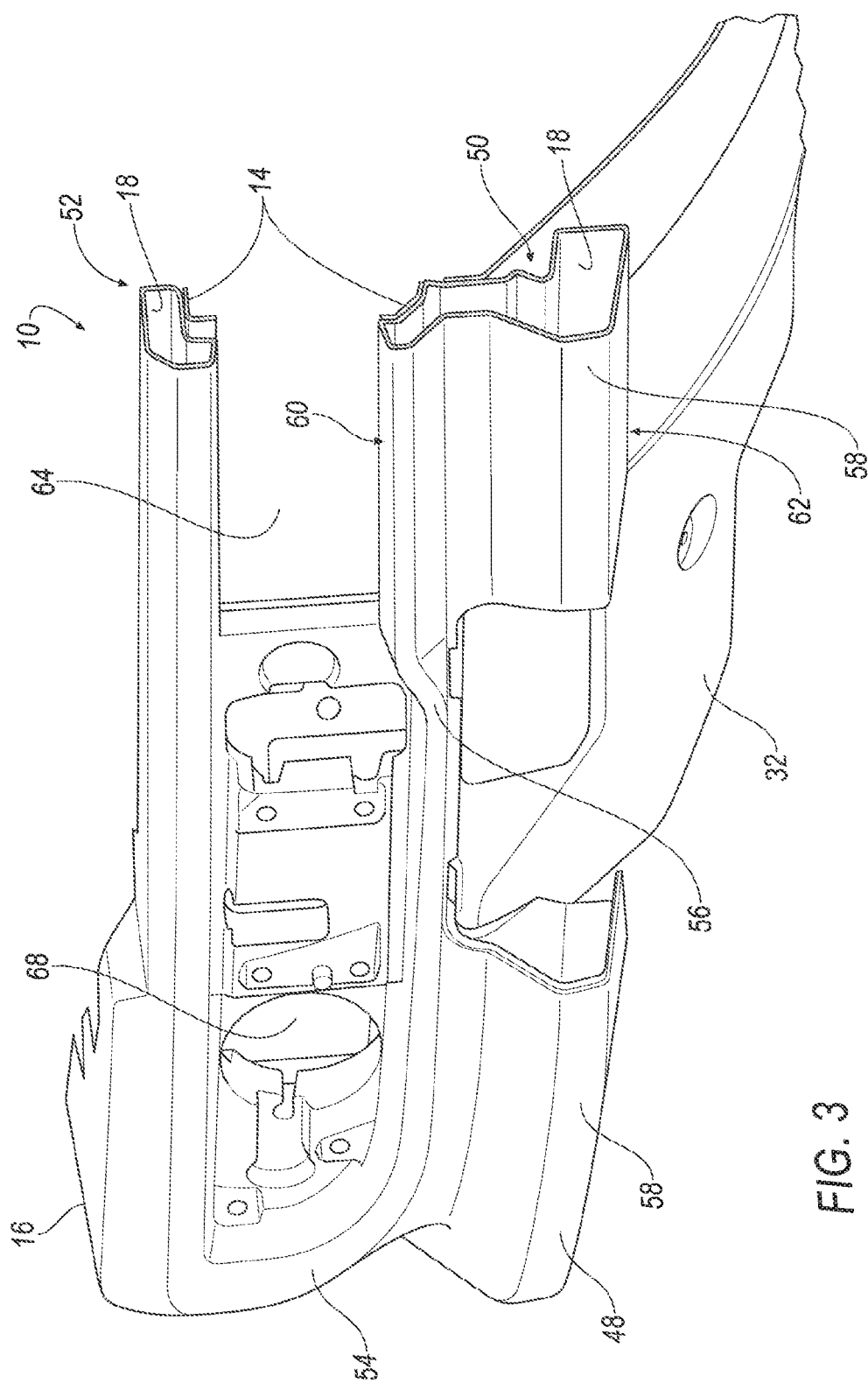
FIG. 3 is a cut-away view of the bumper assembly.
Figure 4:
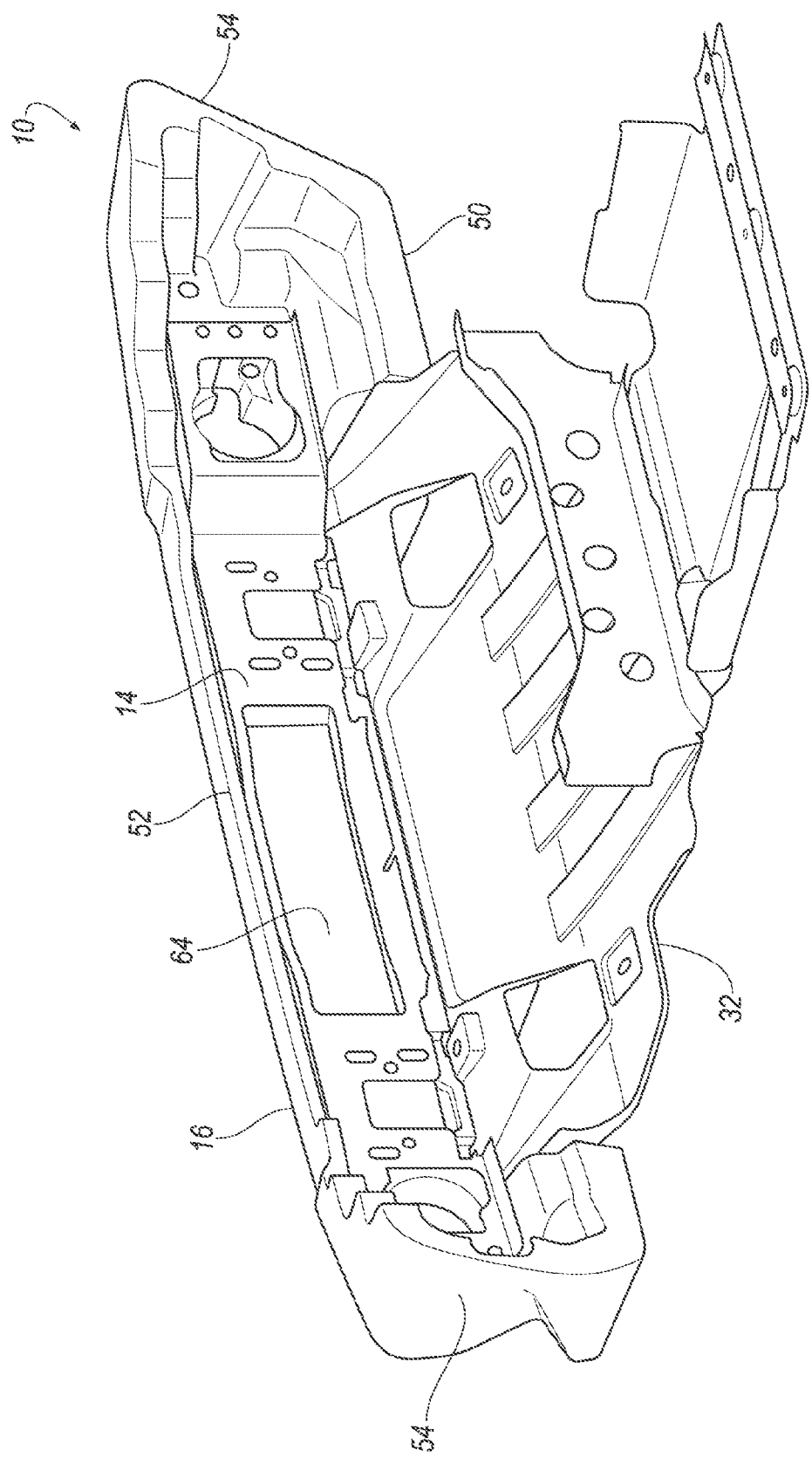
FIG. 4 is a rear view of the bumper assembly.

The bumper 16 includes a lower beam 50, an upper beam 52, and sides 54 connecting the lower beam 50 and the upper beam 52. The sides 54 are spaced from each other on opposite sides 54 of the vehicle 12. The lower beam 50 and the upper beam 52 may extend from one side 54 to the other side 54. The lower beam 50 may include a spine 56 extending continuously from one side 54 to the other side 54 and one or more lobes 58 extending downwardly from the spine. In the example shown in the Figures, the lower beam 50 includes three lobes 58. The cavity 18 extends through the spine 56 and all three lobes 58 in the example shown in the Figures. The bumper beam 14 abuts the upper beam 52 and the lower beam 50, as shown in FIGS. 3 and 4.

The bumper 16 defines a cavity 18 enclosed by the bumper 16. In other words, the plastic of the bumper 16 prevents substantially all fluid communication between the cavity 18 and the external atmosphere. Specifically, minimal communication may exist between the cavity 18 and the external atmosphere as small water drain holes, manufacturing artifacts such as locating holes, pin retraction holes, etc.

The cavity 18 is elongated in the cross-vehicle direction CV. Specifically, the cavity 18 may extend from one side 54 to the other side 54 through the lower beam 50. The cavity 18 may also extend from one side 54 to the other side 54 through the upper beam 52. The cavity 18 may extend continuously through the lower beam 50, both sides 54, and the upper beam 52 in a loop, i.e., a continuous circuit. In such an example, the cavity 18 may be formed by blow-molding.

The lower beam 50 has an upper end 60 at the spine 56 and a lower end 62 spaced from the spine 56. The lower beam 50 terminates at the lower end 62, i.e., the lower end 62 is a terminal end. The cavity 18 may increase in thickness in a vehicle-rearward direction R from the upper end 60 toward the lower end 62. The thickest region of the lower beam 50 may be at the lower end 62. The thickest portion of the cavity 18 may be at the lower end. At least a portion of the cavity 18 is greater than 30 mm in a vehicle-rearward direction R. For example, the cavity 18 may be greater than 30 mm at the lower end 62. In such an example, the cavity 18 may be the thickest at the lower end 62.

The cavity 18 is aligned with a knee 20 of a pedestrian impact test leg form 22. Specifically, the cavity 18 may be aligned with a knee 20 of a flex-PLI leg form 22. As described above, the bumper 16 collapses at the cavity 18 during impact with the knee 20. The region of the cavity 18 vertically aligned with the knee 20 may be greater than 30 mm in a vehicle-rearward direction R. The thickest region of the cavity 18 may be aligned with the knee 20.

The bumper 16 has a reference height less than 500 mm. As is known, the reference height is determined by moving a panel positioned 25 degrees from horizontal toward the bumper 16. The first point of the bumper 16 to touch the panel is the bumper 16 reference height.

In operation during a pedestrian protection test, the bumper 16 and the grille 38 contact the leg form 22 substantially simultaneously. The grille reinforcement 36 reinforces the grille 38. The bumper 16 impacts the leg form 22 at the knee 20 and the bars 44 impact the leg form 22 above the knee 20, as shown in FIG. 8, to distribute the loading on the leg form 22 and reduce relative movement between the femur and the tibia.

Figure 2:
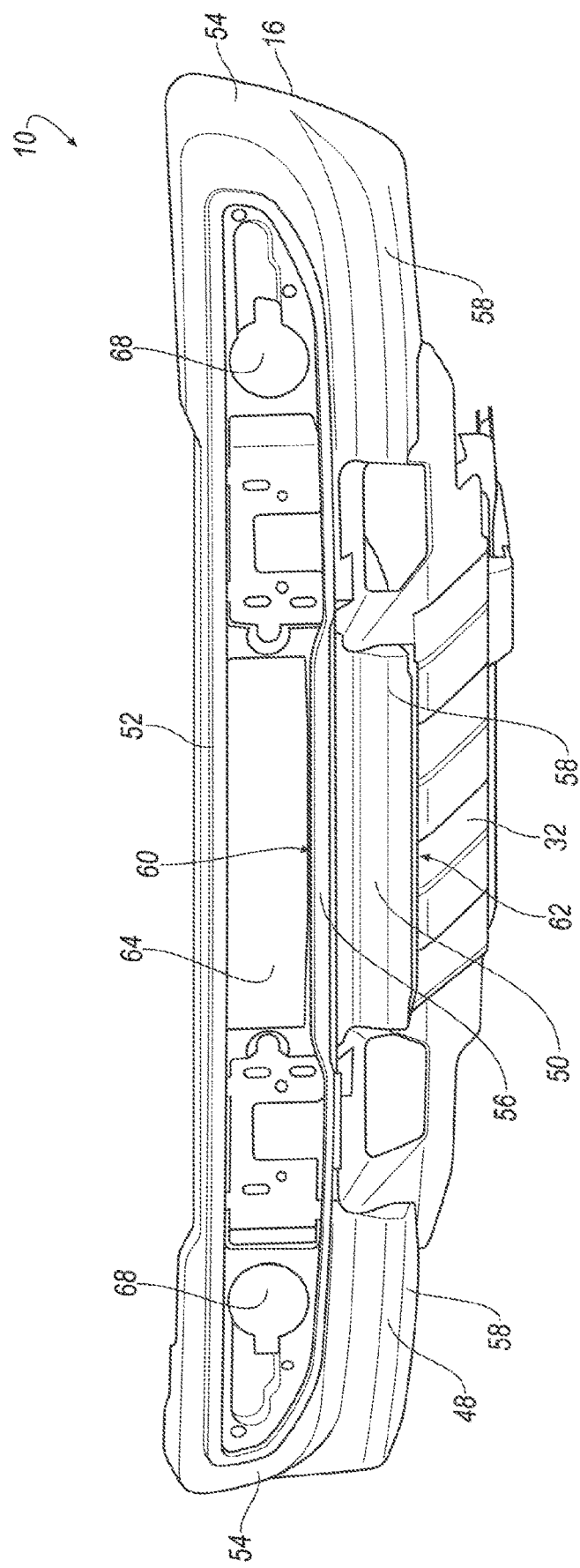
FIG. 2 is a perspective view of a bumper of the bumper assembly.

With reference to FIGS. 2-4, the bumper 16 includes an air intake 64 elongated in the cross-vehicle direction CV. The upper beam 52 is above the air intake 64 and the lower beam 50 is below the air intake 64.

With continued reference to FIGS. 2-4, the bumper 16 includes lamp compartments 66 between the upper beam 52 and the lower beam 50. The bumper 16 includes lamp compartments 66 may be above a portion of the cavity 18. The upper beam 52 is above the lamp compartments 66 and a lower beam 50 is below the lamp compartments 66. The lamp compartments 66 receive lamps, e.g., fog lamps, as shown in FIG. 1.

A skid plate 32 abuts the bumper 16. For example, the skid plate 32 abuts the lower beam 50 below the bumper beam 14. The skid plate 32 extends from the bumper 16 in the vehicle-rearward direction R. The skid plate 32 may extend from the bumper 16 to the frame 24. The skid plate 32 may back the lower beam 50 to resist rearward twisting of the lower beam 50. This may encourage collapse of the lower beam 50 at the cavity 18. The skid plate 32 follows the contours of the lower beam 50. The skid plate 32 sheds airflow, water, mud, etc. The skid plate 32 may be plastic or metal.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly comprising:
a bumper beam elongated in a cross-vehicle direction;
a bumper that is plastic, the bumper being elongated in the cross-vehicle direction and affixed to the bumper beam, the bumper beam being rigid relative to the bumper;
the bumper defining a cavity enclosed by the bumper, the cavity being elongated in the cross-vehicle direction;
the bumper including an upper beam and a lower beam spaced from the upper beam, the lower beam defining the cavity;
the bumper beam abutting the upper beam; and
a skid plate abutting the lower beam, the lower beam being vehicle-forward of the skid plate.

2. The bumper assembly of claim 1, wherein the bumper includes an air intake elongated in the cross-vehicle direction.

3. The bumper assembly of claim 2, wherein the upper beam is above the air intake and the lower beam is below the air intake, the upper beam, and the upper beam and the lower beam being monolithic.

4. The bumper assembly of claim 3, wherein the bumper incudes lamp compartments between the upper beam and the lower beam.

5. The bumper assembly of claim 1, wherein the bumper includes lamp compartments above the cavity.

6. The bumper assembly of claim 5, wherein the upper beam is above the lamp compartments and the lower beam is below the lamp compartments.

7. The bumper assembly of claim 1, wherein the bumper beam abuts the upper beam and the lower beam.

8. The bumper assembly of claim 1, wherein the lower beam has an upper end and a lower end and increases in thickness in a vehicle-rearward direction toward the lower end.

9. The bumper assembly of claim 8, wherein the cavity increases in thickness in the vehicle-rearward direction toward the lower end of the lower beam.

10. The bumper assembly of claim 1, wherein the bumper has a lower end and the cavity increases in thickness to the lower end.

11. The bumper assembly of claim 10, wherein at least a portion of the cavity at the lower end is greater than 30 mm in a vehicle-rearward direction.

12. The bumper assembly of claim 1, wherein the skid plate abuts the bumper below the bumper beam and from the lower end in a vehicle-rearward direction.

13. The bumper assembly of claim 1, wherein the bumper has a class-A surface.

14. The bumper assembly of claim 1, wherein the bumper beam is metal.

15. The bumper assembly of claim 1, wherein the bumper has a reference height less than 500 mm.

16. The bumper assembly of claim 1, wherein the cavity is aligned with a knee of a pedestrian impact test leg form.

17. The bumper assembly of claim 1, wherein the cavity is aligned with a knee of a flex-PLI leg form.

18. The bumper assembly of claim 1, wherein the bumper is blow molded.

* * * * *

UNITED STATES PATENT AND TRADEMARK OFFICE
CERTIFICATE OF CORRECTION

PATENT NO. : 11,305,710 B2
APPLICATION NO. : 16/522733
DATED : April 19, 2022
INVENTOR(S) : Shenaq et al.

It is certified that error appears in the above-identified patent and that said Letters Patent is hereby corrected as shown below:

In the Claims

Column 7, Line 20 Claim 3, Line 3: replace "air intake, the upper beam, and the upper beam and the lower beam" with "--air intake, the upper beam and the lower beam--"

Signed and Sealed this
Nineteenth Day of July, 2022

Katherine Kelly Vidal
*Director of the United States Patent and Trademark Office*